(12) United States Patent
Oh

(10) Patent No.: US 7,644,710 B2
(45) Date of Patent: Jan. 12, 2010

(54) GRILL

(76) Inventor: Sang Seon Oh, #1-64, Hangchon-Dong, Jongno-Gu, Seoul 110-091 (KR)

( * ) Notice: Subject to any disclaimer, the term of this patent is extended or adjusted under 35 U.S.C. 154(b) by 599 days.

(21) Appl. No.: 11/569,124

(22) PCT Filed: Aug. 29, 2005

(86) PCT No.: PCT/KR2005/002849

§ 371 (c)(1),
(2), (4) Date: Nov. 14, 2006

(87) PCT Pub. No.: WO2006/046804

PCT Pub. Date: May 4, 2006

(65) Prior Publication Data

US 2007/0169769 A1     Jul. 26, 2007

(30) Foreign Application Priority Data

Oct. 27, 2004  (KR) .................. 10-2004-0086238

(51) Int. Cl.
*F24B 3/00*     (2006.01)
*F24B 1/20*     (2006.01)

(52) U.S. Cl. ............... 126/25 R; 99/443 C; 99/339; 126/9 R

(58) Field of Classification Search ............... 126/25 R, 126/9 R, 41 B, 41 C; 99/443 C, 332, 423, 99/450, 352, 339, 340, 386, 427, 443 R; 198/461.2, 198/779, 793
See application file for complete search history.

(56) References Cited

U.S. PATENT DOCUMENTS 3,580,164 A * 5/1971 Baker .................. 99/339
3,757,671 A 9/1973 Warshauer et al.
4,103,606 A * 8/1978 Gitcho .................. 99/443 C
4,271,960 A * 6/1981 Chalich .................. 198/779

(Continued)

FOREIGN PATENT DOCUMENTS

EP     0099551     2/1984

(Continued)

*Primary Examiner*—Kenneth B Rinehart
*Assistant Examiner*—Chuka C Ndubizu
(74) *Attorney, Agent, or Firm*—IPLA P.A.; James E. Bame

(57) ABSTRACT

The present invention relates to a turning type charcoal roast board, and more particularly, to a turning type charcoal roast board, wherein if exchange of a used roast board is required during roast of meat using a charcoal fire, new roast rods are placed at an opening of a main body of the roast board in such a manner that the roast rods stored in a roast rod-supplying box are fed via a moving means through users simple operation of a control device for controlling the feeding of the roast rods installed on a main body of the charcoal roast board, and roast rods used at the opening of the main board are transferred to and received in a roast rod-receiving box by means of rotation of the moving means. According to the present invention, the roast board can be rapidly exchanged to prevent meat from being burned, and it is possible to eliminate inconvenience in use due to frequent exchange of roast boards. Further, roast rods that have been used for roast of meat can be easily discharged and washed, thereby ensuring convenience of use and always maintaining the roast board in a clean and hygienic state.

19 Claims, 13 Drawing Sheets

U.S. PATENT DOCUMENTS

| | | | |
|---|---|---|---|
| 4,293,064 A * | 10/1981 | Robinson | 198/779 |
| 4,750,469 A | 6/1988 | Biggs | |
| 4,987,880 A | 1/1991 | Zabala | |
| 6,041,912 A * | 3/2000 | Finkowski et al. | 198/461.2 |
| 7,334,517 B2 * | 2/2008 | Gaskill et al. | 99/339 |
| 2004/0168580 A1 * | 9/2004 | Harrison et al. | 99/443 C |

FOREIGN PATENT DOCUMENTS

| | | |
|---|---|---|
| GB | 2156201 | 10/1985 |
| KR | 1020030080881 | 10/2003 |

* cited by examiner

[Fig. 1]
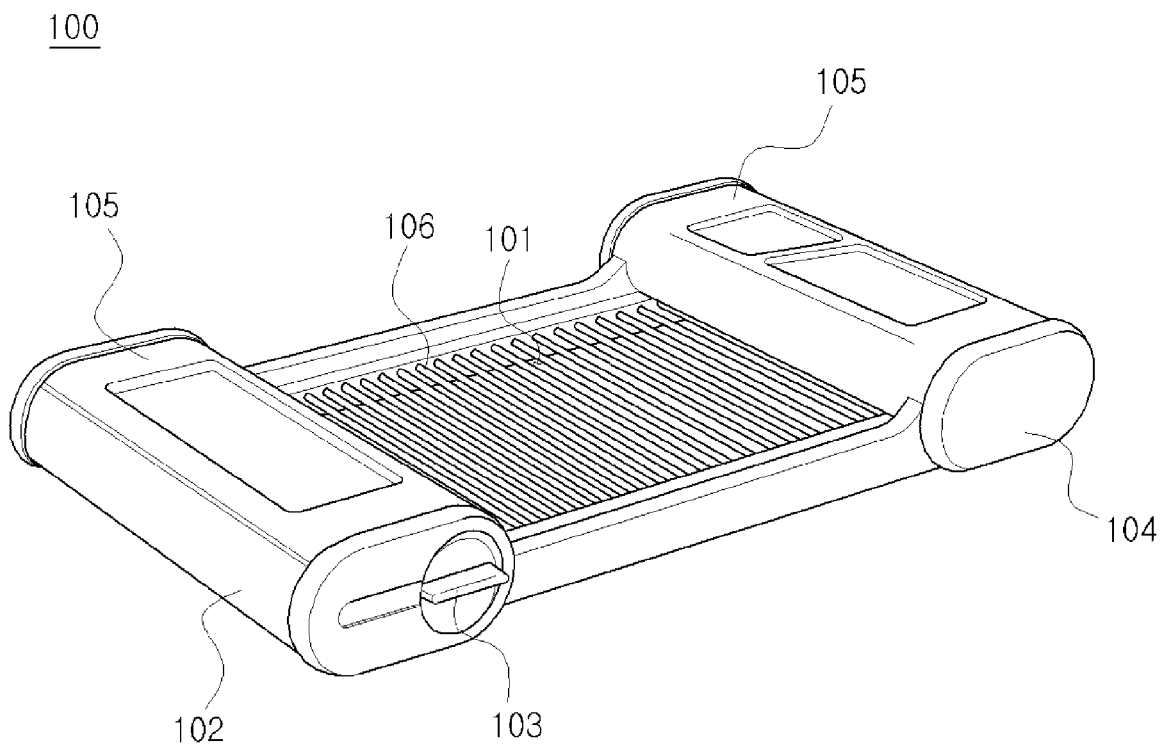
[Fig. 2]
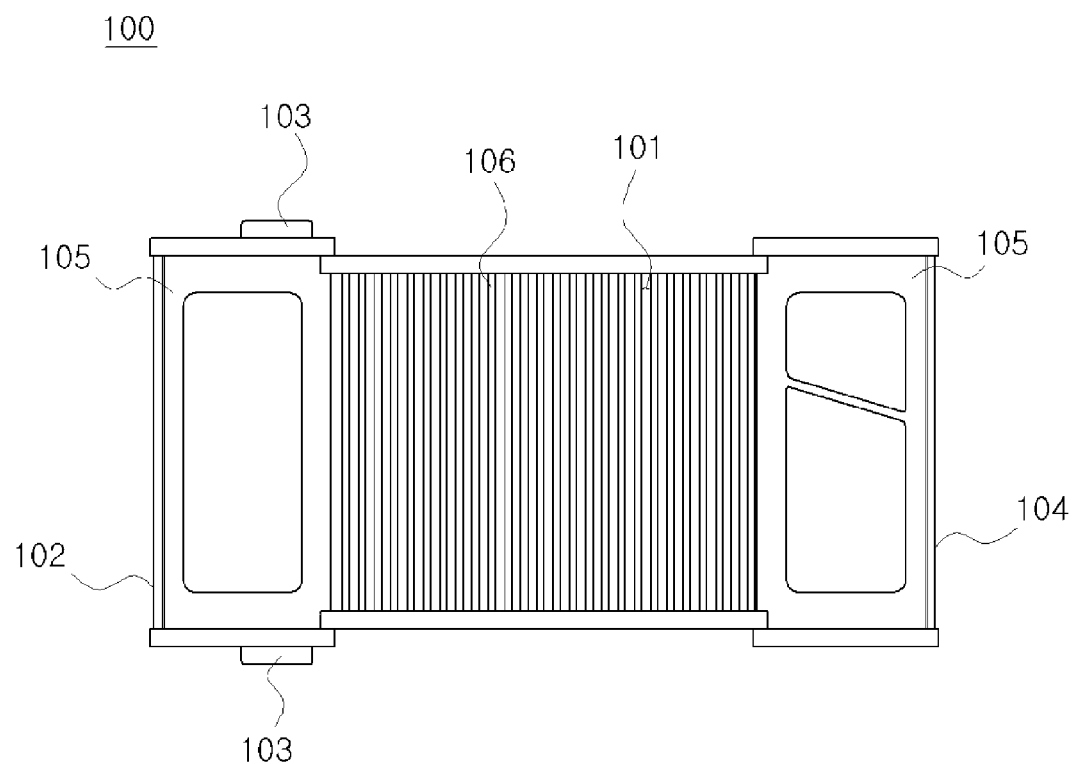

[Fig. 3]
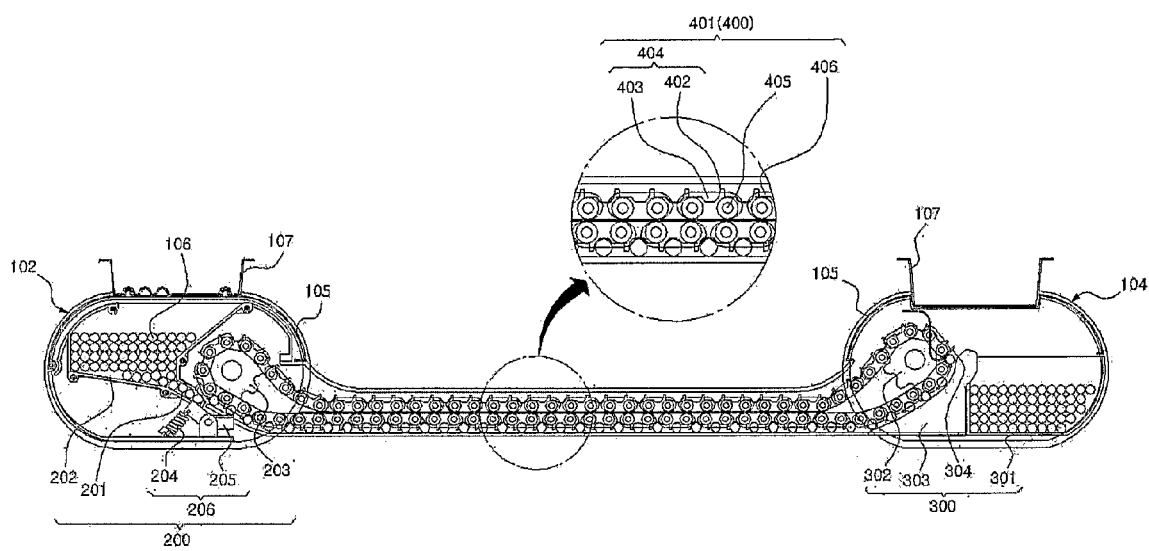

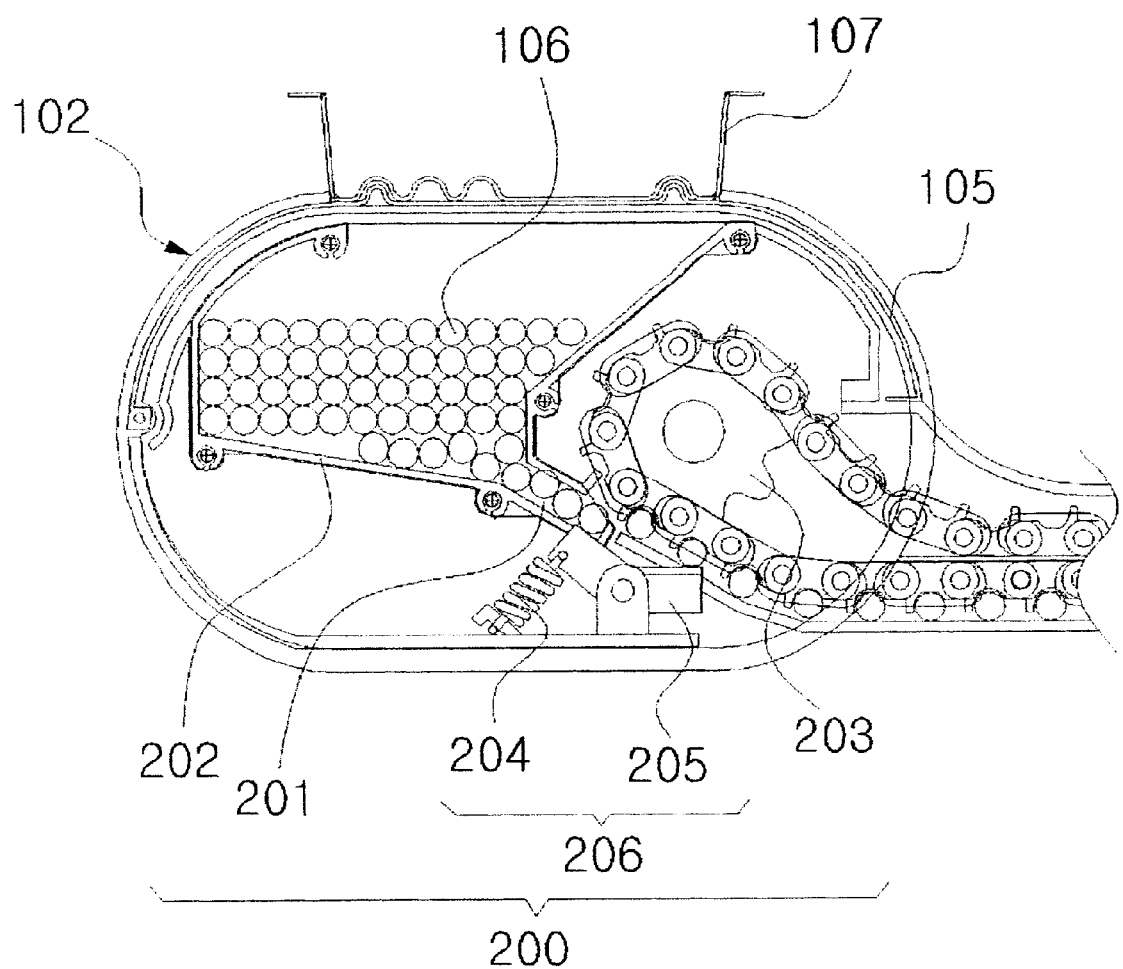
[Fig. 4]

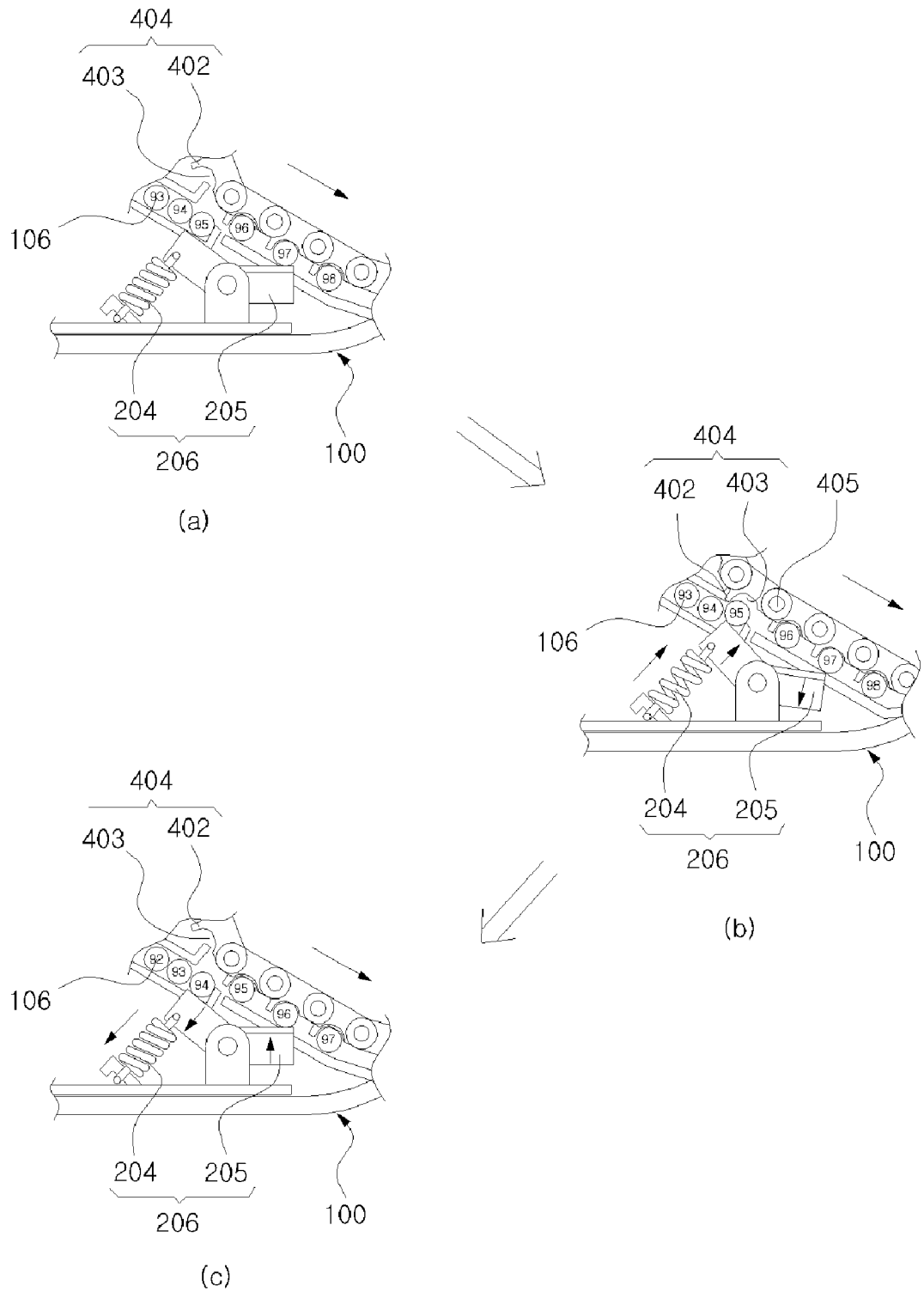
[Fig. 5]

[Fig. 6]
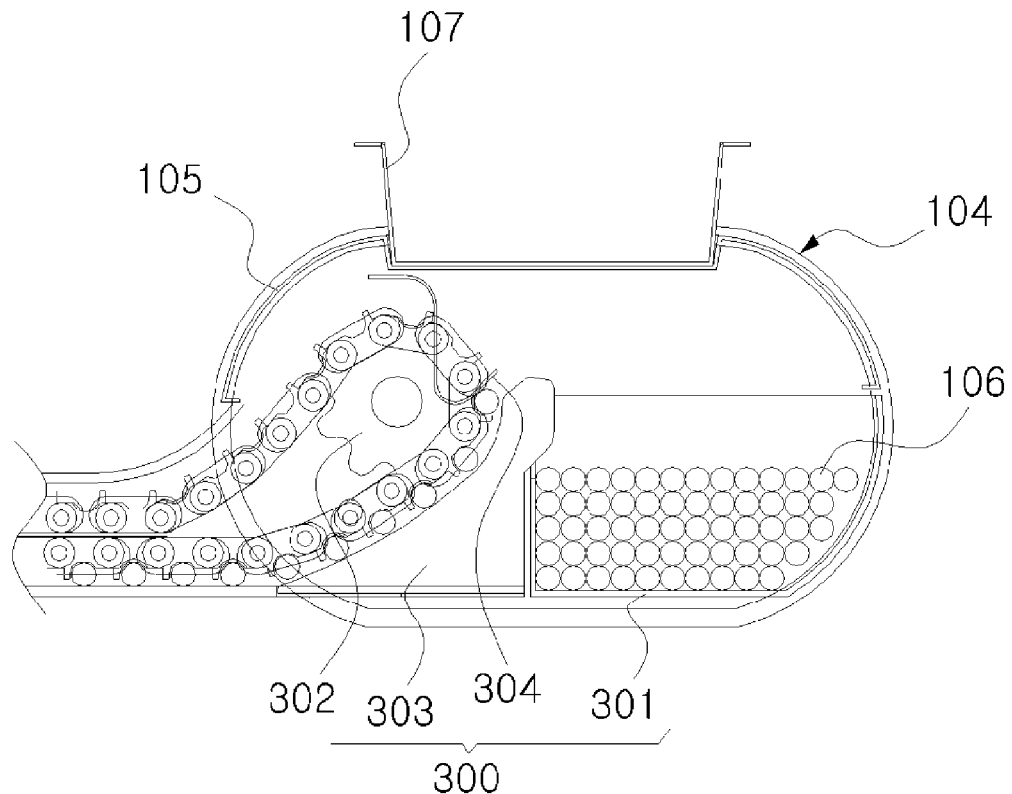
[Fig. 7]
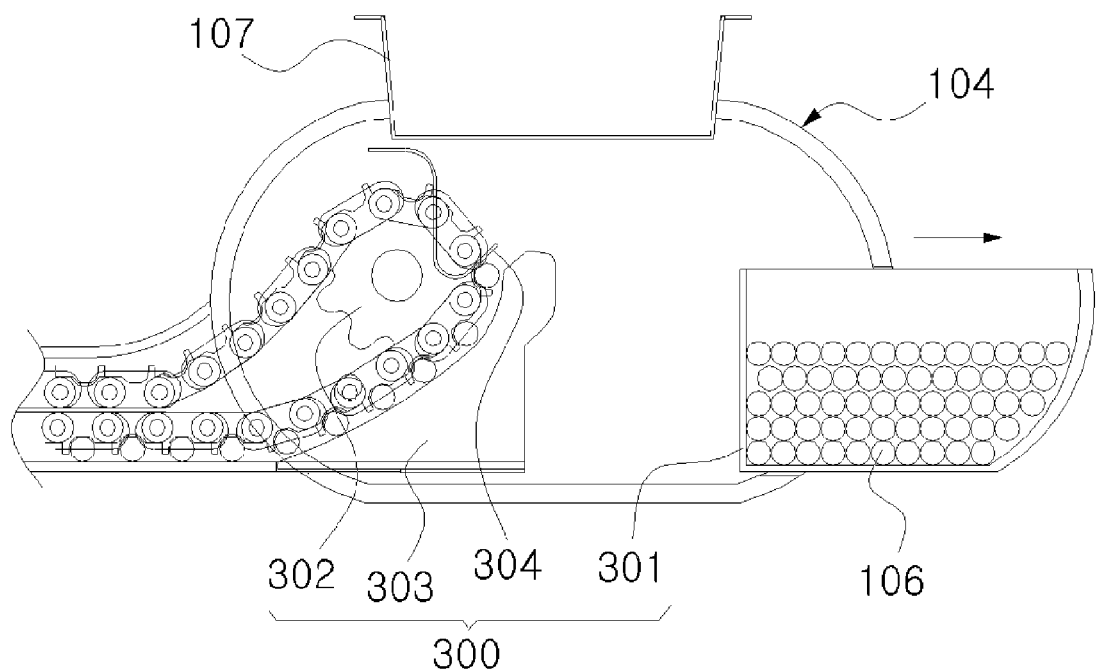

[Fig. 8]
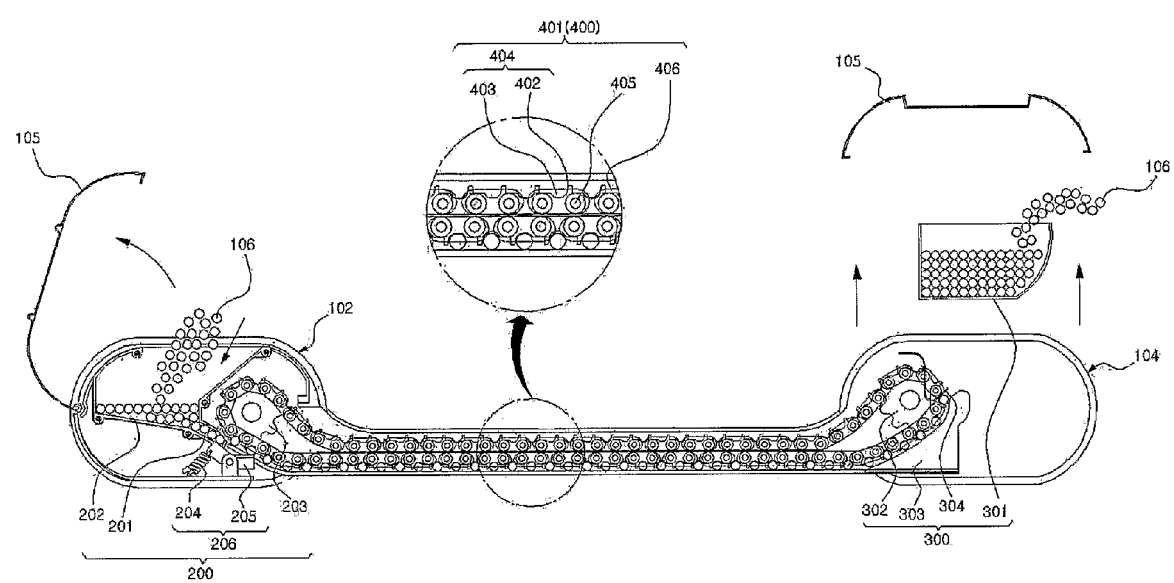

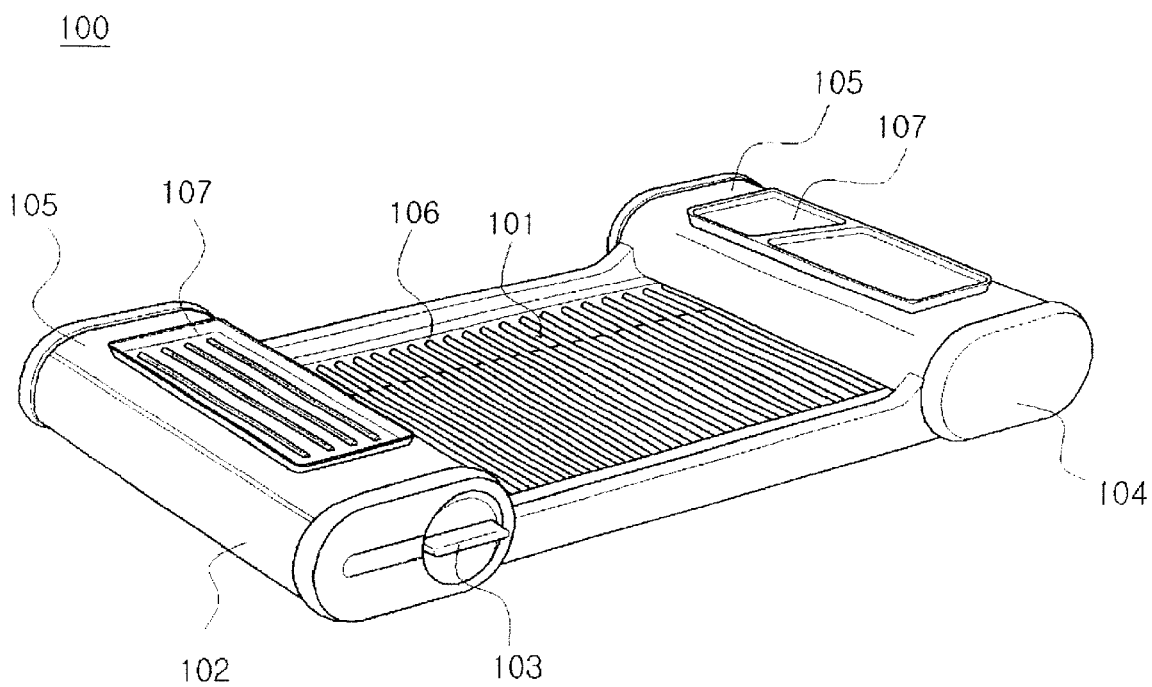
[Fig. 9]

[Fig. 10]
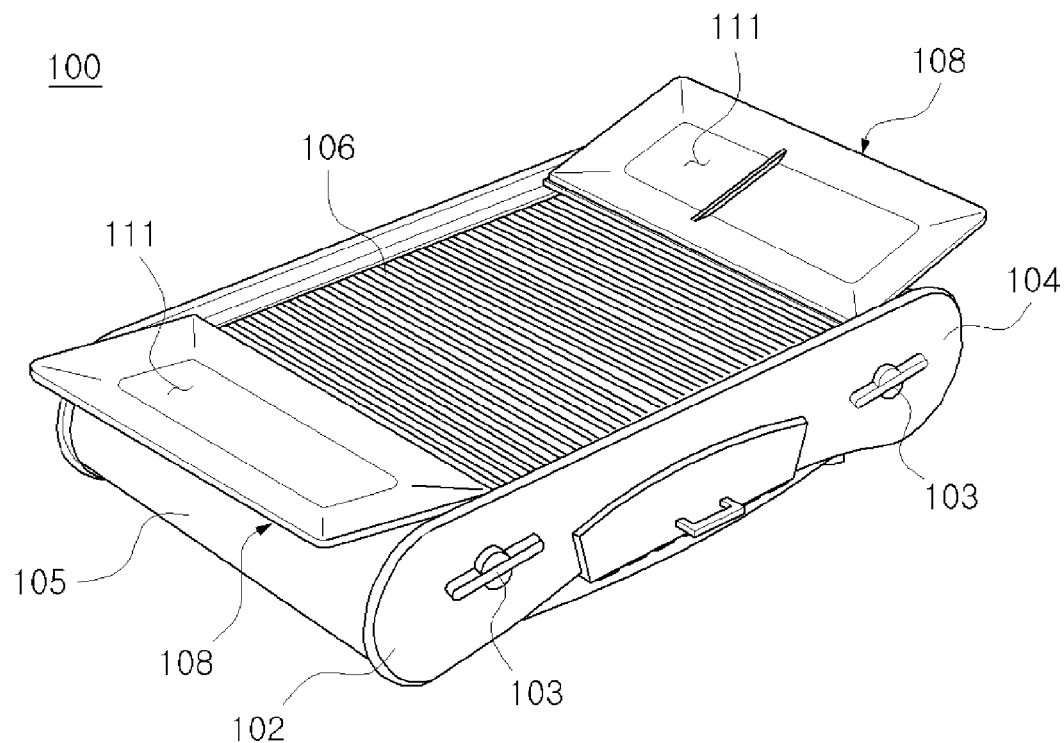
[Fig. 11]
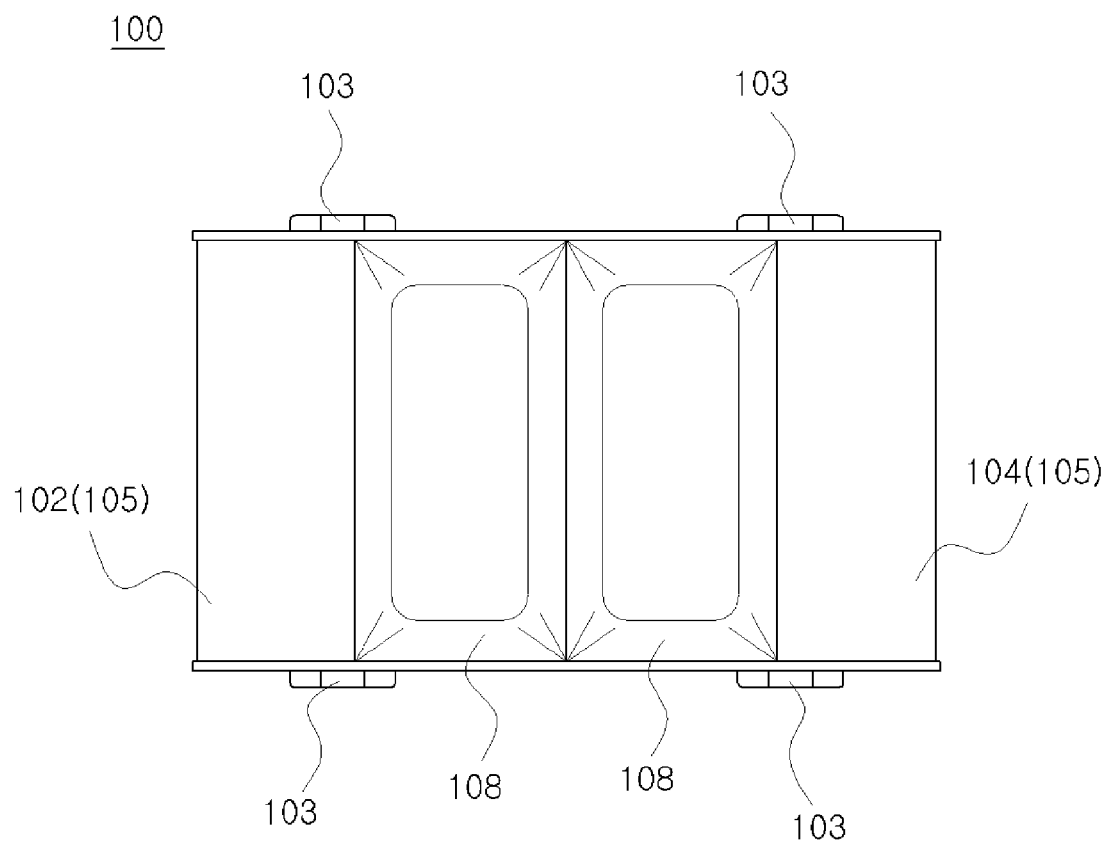

[Fig. 12]
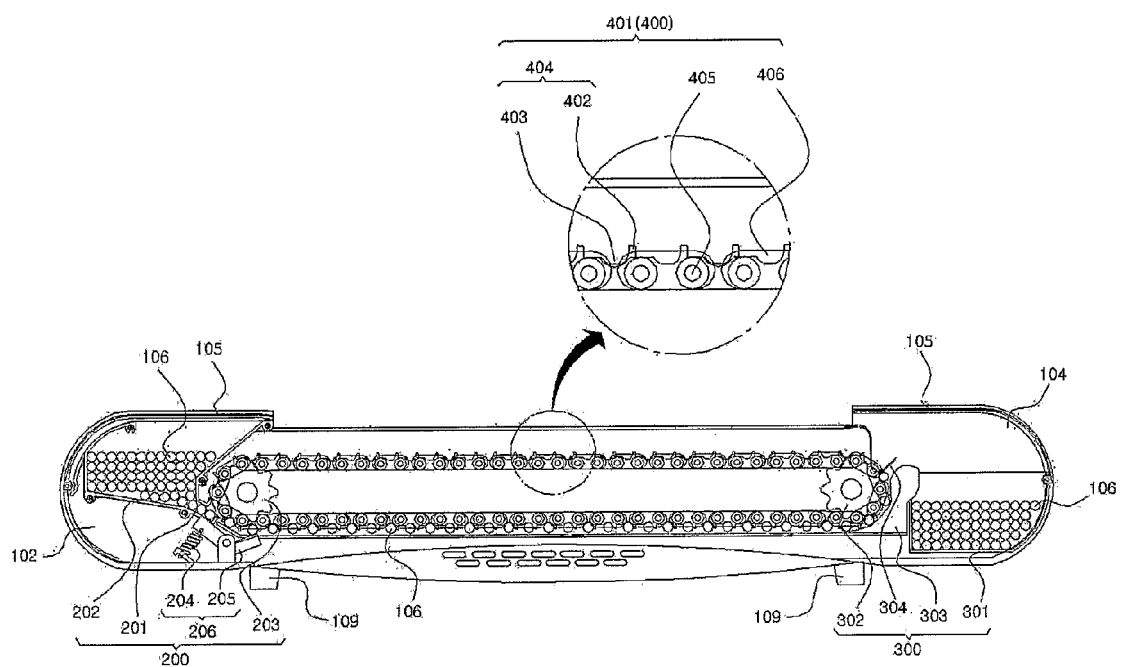

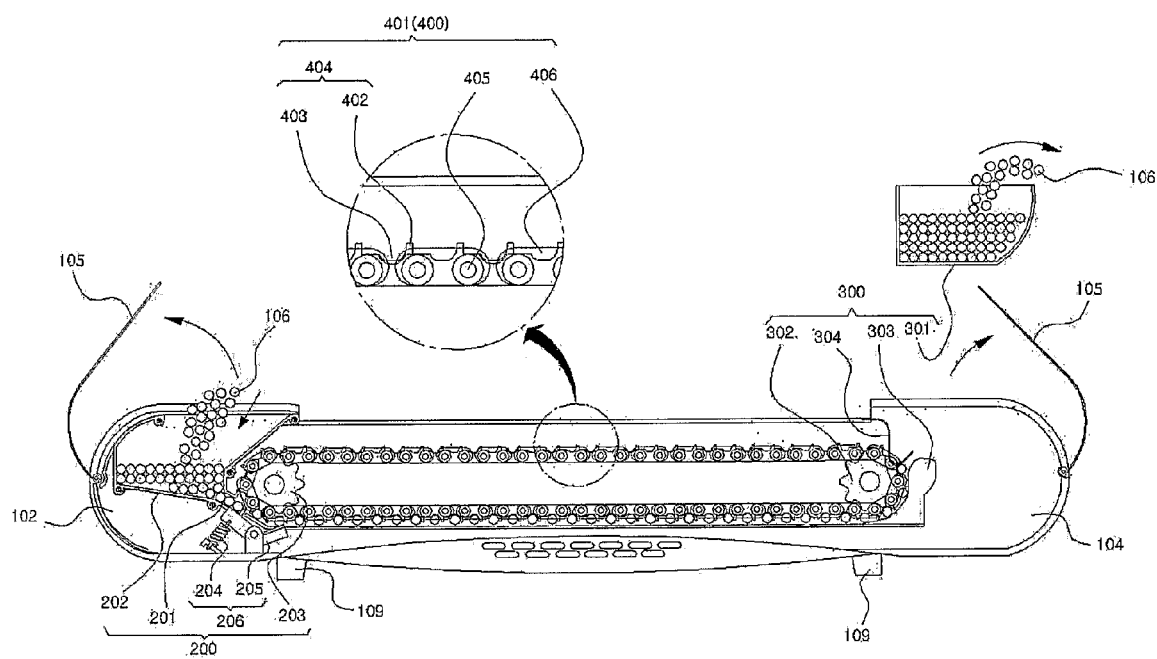
[Fig. 13]

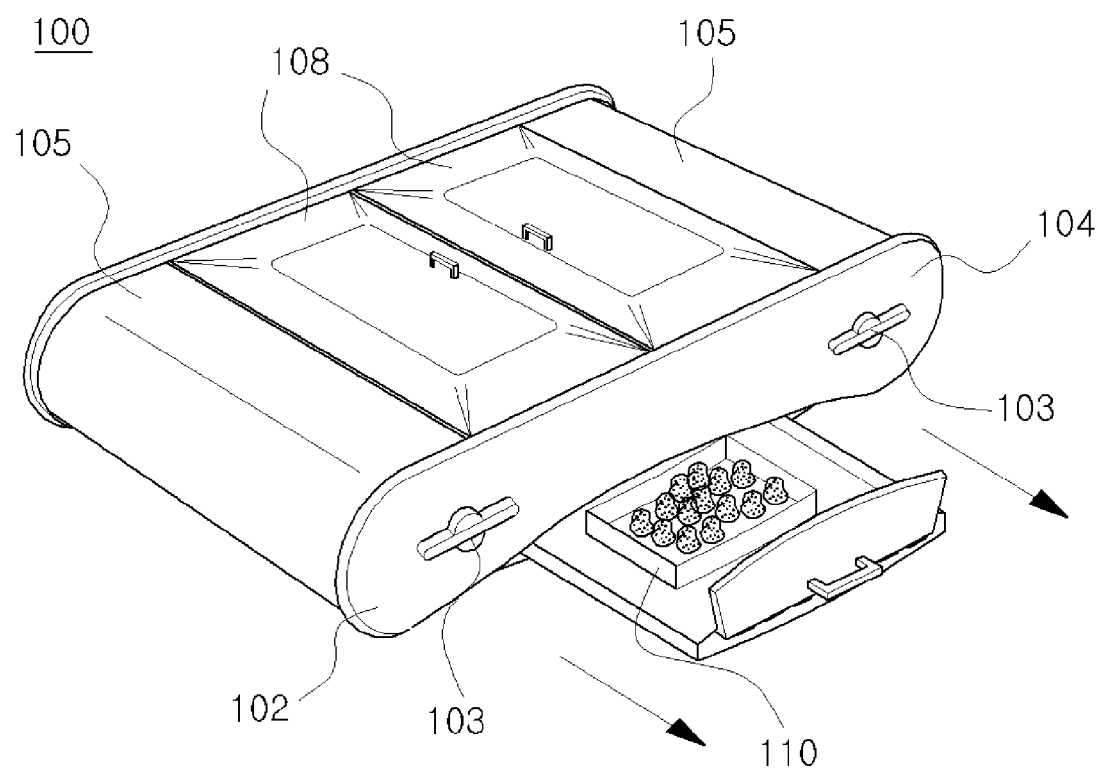
[Fig. 14]

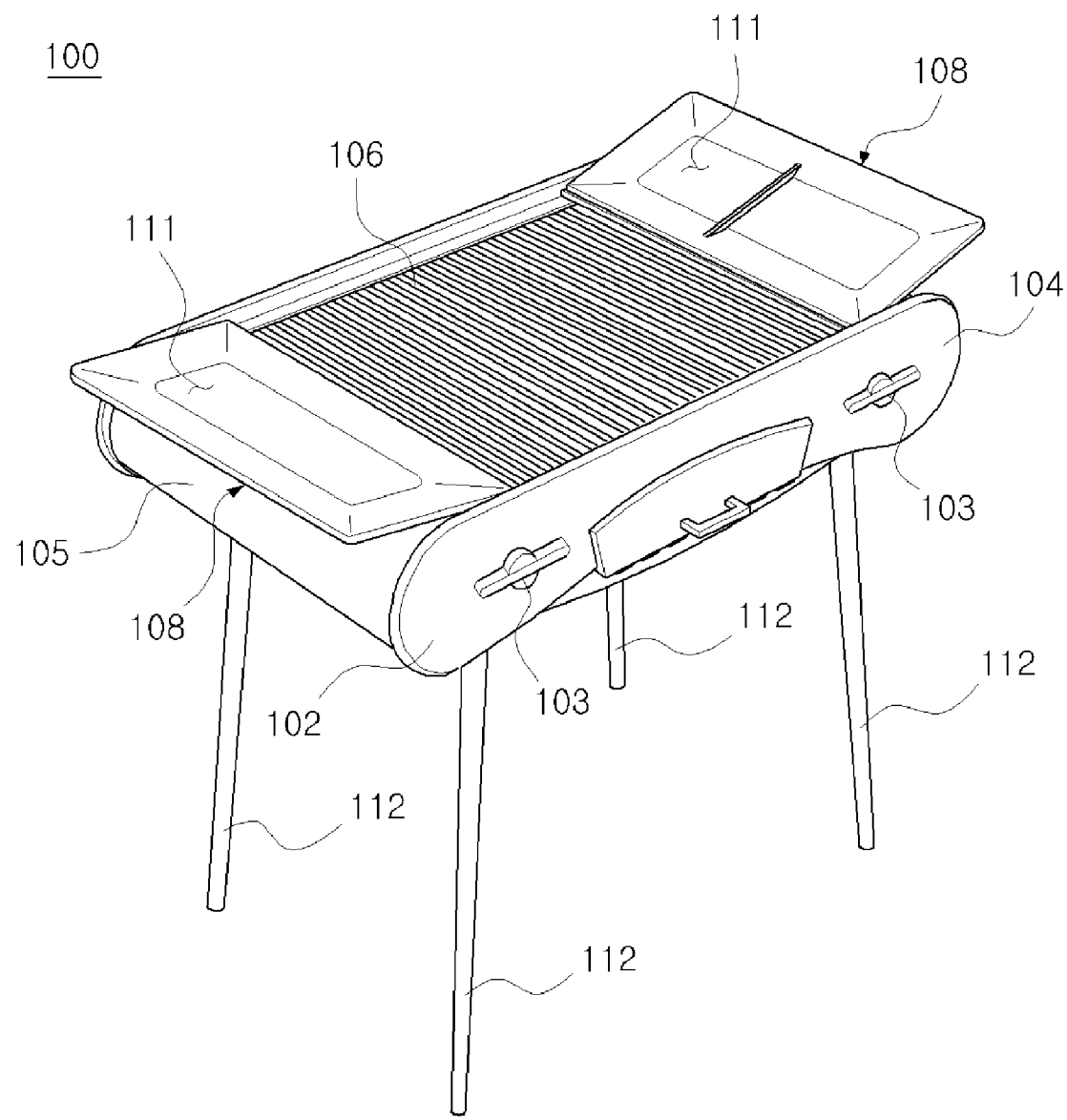
[Fig. 15]

[Fig. 16]
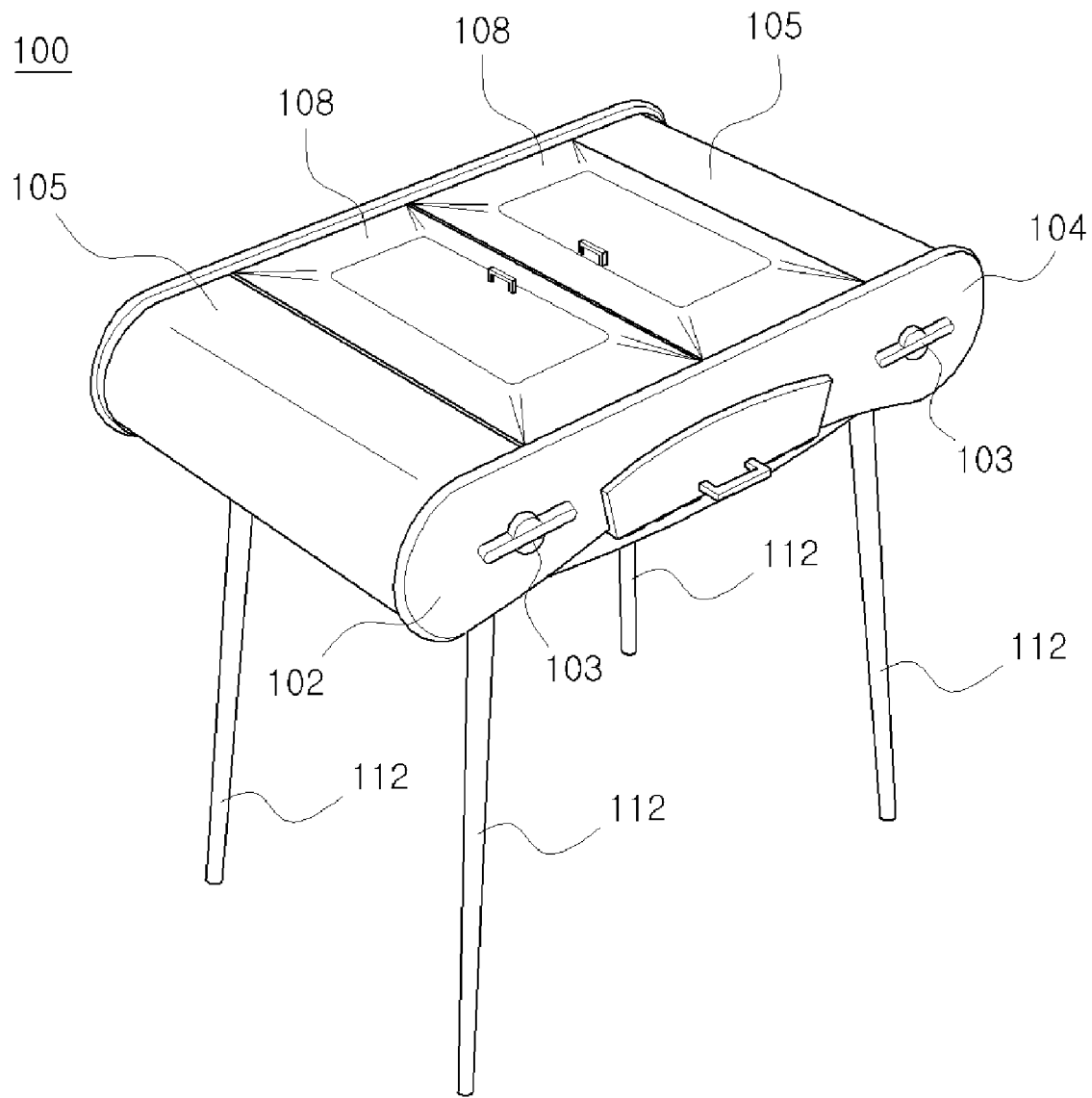

GRILL

TECHNICAL FIELD

The present invention relates to a turning type charcoal roast board, and more particularly, to a turning type charcoal roast board, wherein if exchange of a used roast board is required during roast of meat using a charcoal fire, a new roast board is configured in such a manner that roast rods are supplied, fed and discharged through users simple operation of a control device installed on a main body of the charcoal roast board.

BACKGROUND ART

As well known, charcoal roast boards currently used in restaurants and the like simply comprise circular or rectangular grills. When such a conventional grill is used as a charcoal roast board, exchange of roast boards should be performed typically about 3 or 4 times to prevent meat from being burned. Thus, there is inconvenience in use due to the frequent exchange of conventional charcoal roast boards, and there is also a risk of the occurrence of a safety accident upon exchange of roast boards by a service worker. Further, there are many problems of customers dissatisfaction caused due to delayed exchange of charcoal roast boards, and increased personnel expenses due to an increase in the number of service workers, and the like.

Moreover, when the charcoal roast boards are washed, additional service workers manually wash them one by one. This causes a problem of increased management costs that result from increased personnel expenses, increased working time due to difficulty in washing the charcoal roast boards, and the like.

DISCLOSURE OF INVENTION

Technical Solution

Accordingly, the present invention is conceived to solve the aforementioned problems in the prior art. An object of the present invention is to provide a turning type charcoal roast board, wherein a new roast board is continuously configured and used without exchange of charcoal roast boards in such a manner that roast rods are supplied, fed and discharged through users simple operation of a control device installed on a main body of the charcoal roast board.

Another object of the present invention is to provide a turning type charcoal roast board, wherein roast rods to be used for the charcoal roast board are configured to be separated one by one rather than to be assembled with one another, thereby facilitating supply and discharge of roast rods to provide convenience in use and ensuring easy washing of roast rods to maintain them in an optimal clean state.

According to an aspect of the present invention for achieving the objects, there is provided a turning type charcoal roast board, comprising a main body including an opening formed to penetrate through a central portion of the main body, first and second case portions with inner spaces on both sides of the opening, and control devices installed on front and rear faces of the first case portion to control feeding of roast rods; a roast rod-supplying unit including a roast rod-supplying box for supplying roast rods to the inner space of the first case portion one by one, and a first rotating means installed in front of a discharge port of the roast rod-supplying box and connected to the control devices; a roast rod-receiving/discharging unit including a roast rod-receiving box installed in the inner space of the second case portion, and a second rotating means installed at one side of a space of the roast rod-receiving box; and a roast rod-moving unit including a roast rod-moving means rotated by being engaged with the first and second rotating means so as to feed the roast rods supplied from the roast rod-supplying box along horizontal lines defining the opening of the main body.

According to another aspect of the present invention, there is provided a turning type charcoal roast board, comprising a main body including a central portion having an open top face and a floor surface on which a charcoal fire is contained, control devices installed on front and rear faces of first and second case portions formed on both sides of the central portion of the main body, doors formed at the tops of the first and second case portions such that they can be opened and closed by pivoting on hinge shafts, lids formed to be opened outwardly from the center of the top face of the main body, and four legs formed on a bottom surface of the main body; a roast rod-supplying unit including a roast rod-supplying box for supplying roast rods to the inner space of the first case portion one by one, and a first rotating means installed in front of a discharge port of the roast rod-supplying box and connected to the control devices; a roast rod-receiving/discharging unit including a roast rod-receiving box installed in the inner space of the second case portion, and a second rotating means installed at one side of a space of the roast rod-receiving box; and a roast rod-moving unit including a roast rod-moving means rotated by being engaged with the first and second rotating means so as to feed the roast rods supplied from the roast rod-supplying box along horizontal lines defining the opening of the main body.

BRIEF DESCRIPTION OF THE DRAWINGS

The above and other objects, features and advantages of the present invention will become apparent from the following description of preferred embodiments given in conjunction with the accompanying drawings, in which:

FIG. 1 is a perspective view showing a turning type charcoal roast board according to a first embodiment of the present invention;

FIG. 2 is a plan view of the turning type charcoal roast board shown in FIG. 1;

FIG. 3 is a schematic view showing a detailed inner configuration of the turning type charcoal roast board shown in FIG. 1;

FIG. 4 is an enlarged view specifically showing a roast rod-supplying unit of the turning type charcoal roast board shown in FIG. 3;

FIG. 5 is an exemplary view illustrating an operational principle of a pivoting unit of the turning type charcoal roast board shown in FIG. 3;

FIG. 6 is an enlarged view specifically showing a roast rod-receiving unit of the turning type charcoal roast board shown in FIG. 3;

FIG. 7 is a schematic view showing another version of a roast rod-receiving case of the turning type charcoal roast board shown in FIG. 3;

FIG. 8 is an exemplary view illustrating input and discharge of roast rods in the turning type charcoal roast board according to the first embodiment of the present invention;

FIG. 9 is a perspective view showing a state where containers are installed on the turning type charcoal roast board according to the first embodiment of the present invention;

FIG. 10 is a perspective view showing a turning type charcoal roast board according to a second embodiment of the present invention;

FIG. 11 is a plan view of the turning type charcoal roast board shown in FIG. 10;

FIG. 12 is a schematic view showing a detailed inner configuration of the turning type charcoal roast board shown in FIG. 10;

FIG. 13 is an exemplary view illustrating input and discharge of roast rods in the turning type charcoal roast board shown in FIG. 12;

FIG. 14 is an exemplary view showing a state where a brazier is installed in the turning type charcoal roast board shown in FIG. 12;

FIG. 15 is a perspective view showing a state where the turning type charcoal roast board according to the second embodiment of the present invention has been completely installed and lids have been opened; and FIG. 16 is a perspective view showing a state where the turning type charcoal roast board according to the second embodiment of the present invention has been completely installed and the lids have been closed.

BEST MODE FOR CARRYING OUT THE INVENTION

Hereinafter, embodiments of a turning type charcoal roast board of the present invention will be described in detail with reference to the accompanying drawings.

FIG. 1 is a perspective view showing a turning type charcoal roast board according to a first embodiment of the present invention; FIG. 2 is a plan view of the turning type charcoal roast board shown in FIG. 1; and FIG. 3 is a schematic view showing a detailed inner configuration of the turning type charcoal roast board shown in FIG. 1. The turning type charcoal roast board according to the first embodiment of the present invention roughly comprises a main body 100, a roast rod-supplying unit 200, a roast rod-receiving/discharging unit 300, and a roast rod-moving unit 400.

The main body 100 of the roast board generally takes the shape of a rectangle and has an opening 101 formed to penetrate through a central portion of the main body 100. Control devices 103 for controlling feeding of roast rods 106 are installed on front and rear faces of a first case portion 102 formed on one side of the opening 101, and a second case portion 104 with a space of a predetermined size is formed on the other side of the opening 101. Each of the first and second case portions is formed with a door 105 that can be externally opened and closed.

The control device 103 may be implemented in various manners such as a control lever manually operated or a motorized automatic button with a small motor mounted therein.

Here, additional containers 107 for containing meat, vegetables, seasoned bean paste, and the like may be installed on top surfaces of the first and second case portions 102 and 104 in such a manner that they are installed detachably while conforming to patterns on the top surfaces of the first and second case portions 102 and 104. The containers 107 can be seen from a perspective view of the turning type charcoal roast board shown in FIG. 9.

Further, preferably, the door 105 formed at the first case portion 102 is configured such that one side thereof can be opened upwardly while pivoting on a hinge shaft (not shown) formed at the other side thereof, whereas the door 105 formed at the second case portion 104 is configured to be in the form of a lid that is detachably opened by being lifted upwardly. The doors 105 can be seen from an exemplary view of FIG. 8.

The roast rod-supplying unit 200 is inserted into an inner space of the first case portion 102. As shown in FIGS. 3 to 5, the roast rod-supplying unit 200 comprises a roast rod-supplying box 202 with a discharge port 201 through which the roast rods 106 are discharged into the inner space of the first case portion 102; a pair of first rotating means 203 placed in front of the discharge port 201 of the roast rod-supplying box 202 and connected to the control devices 103; and a pivoting unit 206 configured by means of a combination of a spring 204 and a pivoting hinge 205 installed on a floor of the first case portion 102 at the rear of the discharge port 201 of the roast rod-supplying box 202.

As can be seen from FIG. 8, the roast rod-supplying box 202 functions to receive the plurality of roast rods 106 that are supplied from above in a state where the door 105 of the first case portion 102 has been opened at one side thereof while pivoting on a hinge shaft (not shown), and to discharge the roast rods 106 one by one through the discharge port 210. It is preferred that the roast rod-supplying box 202 have a floor surface inclined at a certain angle so that the roast rods 106 can be easily discharged.

Further, it is preferred that the roast rods 106 be cylindrical rods with a predetermined length, which are made of stainless steel.

The pivoting unit 206 comprises the combination of the spring 204 with elasticity and the pivoting hinge 205 with the function of a seesaw, as specifically shown in FIGS. 4 and 5. The operation of the pivoting unit will be briefly described with reference to FIG. 5.

As shown in FIG. 5 (a), No. 95 roast rod 106 is first placed at the discharge port 210 and No. 97 roast rod 106 is seated on moving means 401 and caught by a right side of the pivoting hinge 205. At this time, if a user rotates at least one control device 103 installed at the front surface and/or the rear surface of the first case portion 102, the pivoting hinge 205 with which No. 97 roast rod 106 is in contact is pressed so that No. 97 roast rod 106 can be moved rightward, and at the same time, due to the seesaw movement of the pivoting hinge 205, the other side of the pivoting hinge 205 lifts No. 95 roast rod 106 toward the moving means 401, as shown in FIG. 5 (b).

Thereafter, the spring 204 and the pivoting hinge 205 that have completed their spring and seesaw activities maintain a state where No. 94 roast rod 106 is placed at the discharge port 201 and No. 96 roast rod 106 seated on the moving means 401 is caught by the right side of the pivoting hinge 205, as shown in FIG. 5 (c).

Further, the roast rod-receiving/discharging unit 300 is inserted into an inner space of the second case portion 104. As can be seen from FIGS. 3 and 6 to 8, the roast rod-receiving/discharging unit 300 comprises a roast rod-receiving box 301 detachably installed therein to receive the roast roads 106 discharged into the inner space of the second case portion 104; a pair of second rotating means 302 installed in front of the roast rod-receiving box 301; a guide body 303 for guiding the moving roast rods 106 between the second rotating means 302 and the roast rod-receiving box 301; and a roast rod-discharging hook 304 for allowing the roast rods 106 moving toward sidewalls of the second case portion 104 where the second rotating means 302 are formed to be stably received in the roast rod-receiving box 301.

Here, as shown in FIG. 6, the roast rod-receiving box 301 functions to sequentially receive the roast rods 106 transferred through the guide body 303 from the moving means 401. At this time, the roast rod-discharging hook 304 pushes the roast rods 106 at the top of the guide body 303 so that the roast rods 106 transferred along the guide body 303 can be stably received in the roast rod-receiving box 301.

Further, as shown in FIG. 8, a service worker withdraws outwardly the roast rod-receiving box 301 in a state where the door 105 of the second case portion 104 is fully opened, and then, takes out the roast rods 106 collected in the roast rod-receiving box 301. On the other hand, as shown in FIG. 7, the roast rod-receiving box 301 may be detachably installed such that it can be inserted into or withdrawn from one side of the second case portion 104 in the same manner as a drawer, and the used roast rods 106 may then be taken out after the roast rod-receiving box 301 has been withdrawn. In this case, an outer peripheral surface of the roast rod-receiving box 301 may be used directly as a door.

The roast rod-moving unit 400 comprises the pair of moving means 401 that are rotated while being engaged with the first and second rotating means 203 and 302 along horizontal lines defining the opening 101 of the main body 100 of the roast board. As for the moving means 401, it is possible to optionally employ a belt or chain with a structure by which the roast rods 106 can be received from the roast rod-supplying portion 200 and then transferred in a fixed state. At this time, it is preferred that the belt be formed with a plurality of recesses in which the roast rods 106 can be seated.

Alternatively, a moving means 401 with a chain structure is configured to take the shape of a circle with a predetermined length of circumference by connecting or assembling the following components: a plurality of catching pieces 404 each of which has a hook 402 formed at one side thereof and a semicircular recess 403 formed at the center thereof; a plurality of chain pins 405 inserted into and connected to both sides of each of the catching pieces 404 in a state where the plurality of catching pieces 404 cross each other; and a plurality of guide pieces 406 for guiding the roast rods 106 seated in the semicircular recesses 403 of the catching pieces 404 so that the roast rods can be stably aligned without protruding from the recesses.

The turning type charcoal roast board according to the first embodiment described above is a table mount type roast board that is used in a state where it is placed on a table where a brazier (not shown) containing a charcoal fire is installed. However, the turning type charcoal roast board is not limited thereto but can be modified in various manners. For example, it may be constructed to be integrally fixed to a table or the like.

Meanwhile, FIGS. 10 to 16 show a turning type charcoal roast board according to a second embodiment of the present invention.

Prior to the description of the turning type charcoal roast board according to the second embodiment of the present invention with reference to the accompanying drawings, it should be understood that the same elements as the first embodiment of the present invention are designated by like reference numerals.

FIG. 10 is a perspective view showing the turning type charcoal roast board according to the second embodiment of the present invention, FIG. 11 is a plan view of the turning type charcoal roast board shown in FIG. 10, and FIG. 12 is a schematic view showing a detailed inner configuration of the turning type charcoal roast board shown in FIG. 10. Likewise the first embodiment described above, the turning type charcoal roast board according to the second embodiment of the present invention roughly comprises a main body 100, a roast rod-supplying unit 200, a roast rod-receiving/discharging unit 300, and a roast rod-moving unit 400.

The main body 100 of the roast board generally takes the shape of a rectangle. A central portion of the main body 100 has an open top face and a floor surface on which a charcoal fire is contained. First and second case portions 102 and 104 are formed on both sides of the central portion of the main body, and control devices 103 are installed on front and rear faces of the first and second case portions 102 and 104. Doors 105 are formed at the tops of the first and second case portions 102 and 104 such that they can be opened and closed by pivoting on hinge shafts (not shown). Lids 108 are formed to be opened outwardly from the center of the top face of the main body. Four legs 109 are formed on a bottom surface of the main body.

Here, a brazier 110 for containing a charcoal fire therein may be additionally installed as shown in FIG. 14 such that it can be withdrawn outwardly in the same manner as a drawer by a door (not shown) from a front face and/or a rear face of the central portion of the main body 100 of the roast board.

Further, as shown in FIGS. 10 and 15, inner surfaces of the lids 108 installed at the top of the central portion of the main body 100 of the roast board are additionally formed with container portions 111 of predetermined depths, which are partitioned to separately contain meat, vegetables, seasoned bean paste and the like therein when the lids are opened. Each of the lids 108 is connected through a hinge shaft (not shown) formed at a side of the front/rear face of the main body 100 and can be opened and closed by pivoting on the hinge shaft.

The legs 109 formed on the bottom surface of the main body 100 may be additionally equipped with downwardly tapered cylindrical auxiliary legs 112 with a predetermined length, as shown in FIGS. 15 and 16, in order to allow the roast board to be placed at a certain higher level when it is used for outdoor barbecue cooking.

Further, it is preferred that the door 105 formed at each of the first and second case portions 102 and 104 be constructed such that an upper portion thereof can be opened toward one side thereof while pivoting on a hinge shaft (not shown) provided at an outer side thereof, as shown in FIG. 13.

The roast rod-supplying unit 200 is inserted into the inner space of the first case portion 102. As shown in FIGS. 12 and 13, the roast rod-supplying unit 200 comprises a roast rod-supplying box 202 with a discharge port 201 through which the roast rods 106 are discharged into the inner space of the first case portion 102; a pair of first rotating means 203 placed in front of the discharge port 201 of the roast rod-supplying box 202 and connected to the control devices 103; and a pivoting unit 206 that is placed at the rear of the discharge port 201 of the roast rod-supplying box 202 and is configured by means of a combination of a spring 204 and a pivoting hinge 205 installed on a floor of the first case portion 102.

Since the structures and operational mechanisms of the components of the roast rod-supplying unit 200 are the same as the aforementioned first embodiment, detailed descriptions thereof will be omitted.

Further, the roast rod-receiving/discharging unit 300 is inserted into an inner space of the second case portion 104. As can be seen from FIGS. 12 and 13, the roast rod-receiving/discharging unit 300 comprises a roast rod-receiving box 301 detachably installed therein to receive the roast roads 106 discharged into the inner space of the second case portion 104; a pair of second rotating means 302 installed in front of the roast rod-receiving box 301 and connected to the control devices 103; a guide body 303 for guiding the moving roast rods 106 between the second rotating means 302 and the roast rod-receiving box 301; and a roast rod-discharging hook 304 for allowing the roast rods 106 moving toward sidewalls of the second case portion 104 where the second rotating means 302 are formed to be stably received in the roast rod-receiving box 301.

Since the structures and operational mechanisms of the components of the roast rod-receiving/discharging unit 300 are the same as the aforementioned first embodiment, detailed descriptions thereof will be omitted.

Moreover, the roast rod-moving unit 400 comprises a pair of moving means 401 that are rotated while being engaged with the first and second rotating means 203 and 302 along horizontal lines defining an opening 101 of the main body 100 of the roast board. As for the moving means 401, it is possible to optionally employ a belt or chain with a structure by which the roast rods 106 can be received from the roast rod-supplying portion 200 and then transferred in a fixed state. At this time, it is preferred that the belt be formed with a plurality of recesses in which the roast rods 106 can be seated.

Alternatively, a moving means 401 with a chain structure is configured to take the shape of a circle with a predetermined length of circumference by connecting or assembling the following components: a plurality of catching pieces 404 each of which has a hook 402 formed at one side thereof and a semicircular recess 403 formed at the center thereof; a plurality of chain pins 405 inserted into and connected to both sides of each of the catching pieces 404 in a state where the plurality of catching pieces 404 cross each other; and a plurality of guide pieces 406 for guiding the roast rods 106 seated in the semicircular recesses 403 of the catching pieces 404 so that the roast rods can be stably aligned without protruding from the recesses.

The charcoal roast board according to the second embodiment of the present invention described above can be conveniently installed and used for outdoor barbecue cooking. Compared with the first embodiment, the second embodiment is different therefrom in view of the following structures: the lids 108 capable of opening and closing the open top face of the central portion of the main body 100; the container portions 111 formed in the inner surfaces of the lids 108 to contain meat, vegetables and seasoned bean paste therein when the lids are opened; the assembly of the legs 109 and the auxiliary legs 112 to ensure a certain height upon outdoor use of the roast board; and either the direct use of a charcoal fire by causing the charcoal fire to be contained in the floor of the central portion of the main body 100, or the optional use of the additional brazier 110 for containing a charcoal fire. The other structures and operational principles of the second embodiment is the same as the aforementioned first embodiment.

Next, the use and operation of the turning type charcoal roast boards according to the embodiments constructed as above will be briefly described with reference to the accompanying drawings.

Since the turning type charcoal roast boards according to the first and second embodiments of the present invention are identical with each other in view of their usage methods and operational principles, only the turning type roast board according to the first embodiment will be described below by way of example.

The turning type roast board according to the first embodiment is used by being placed on a table or the like in which a brazier with a charcoal fire contained therein is installed. If the main body 100 of the roast board is placed and used on a table with a charcoal fire installed therein and exchange of the roast board is then required because meat gets scorched and sticks to the main body of the roast board, a user rotates at least one of the control devices 103 installed on the front and rear faces of the first case portion 102 in one direction by a desired angular distance.

Then, the first rotating means 203 connected to the control devices 103, the moving means 401 engaged with and rotated by the first rotating means 203, and the second rotating means 203 installed in the roast rod-receiving/discharging unit 300 are rotated in one direction by the angular distance resulting from the rotation by the user.

Therefore, roast rods 106 that have been positioned at the opening 101 of the main body 100 and used for roast of meat are received in the roast rod-receiving box 301 of the roast rod receiving/discharging unit 300, and unused roast rods 106 stored in the roast rod-supplying box 202 of the roast rod-supplying unit 200 are seated in the semicircular recesses 403 of the moving means 401 and then moved to and placed at the opening 101 of the main body 100.

This is to transfer and locate an unused new roast board at the opening 101 of the main body 100. As described above, a new roast board is placed by means of simple users manipulation of the control devices 103 without direct exchange of a roast board, thereby ensuring continuous use of the roast board.

At this time, the containers 107 capable of containing meat, vegetables, seasoned bean paste and the like are additionally installed and placed on the top surfaces of the first and second case portions 102 and 104 of the main body 100. The used roast rods 106 received in the roast rod-receiving box 301 of the roast rod-receiving/discharging unit 300 are easily taken out after the roast rod-receiving box 301 has been withdrawn outwardly, and then subjected to a washing process so as to be reused in the future.

According to the turning type charcoal roast board of the present invention, if exchange of a used roast board is required upon roast of meat using a charcoal fire, a new roast board is placed in such a manner that roast rods are supplied, fed and discharged through users simple operation of the control device(s) installed on the main body of the charcoal roast board. Thus, the roast board can be rapidly exchanged to prevent the meat from being burned, and it is possible to eliminate inconvenience in use due to frequent exchange of roast boards. Further, roast rods that have been used for roast of meat can be easily discharged and washed, thereby ensuring convenience of use and always maintaining the roast board in a clean and hygienic state.

Moreover, upon use of the roast board in a restaurant, there are advantages in that it is possible to alleviate service workers efforts to exchange roast boards used by customers and it is possible to simultaneously solve problems of customers dissatisfaction due to delayed exchange of roast boards, needs for additional service workers, and the like. Even in view of washing roast boards and keeping them in a clean state, which are critical problems in restaurants, since the roast boards are discharged in the form of rods, the rods can be easily washed and kept in a clean state. Accordingly, there is an advantage in that management costs such as personnel expenses can be reduced.

The invention claimed is:

1. A turning type charcoal roast board, comprising:
a main body including an opening formed to penetrate through a central portion of the main body, first and second case portions with inner spaces on both sides of the opening, and control devices installed on front and rear faces of the first case portion to control feeding of roast rods;
a roast rod-supplying unit including a roast rod-supplying box for supplying roast rods to the inner space of the first case portion one by one, and a first rotating means installed in front of a discharge port of the roast rod-supplying box and connected to the control devices;
a roast rod-receiving/discharging unit including a roast rod-receiving box installed in the inner space of the second case portion, and a second rotating means installed adjacent to a side of roast rod-receiving box; and a roast rod-moving unit including a roast rod-moving means rotated by being engaged with the first and second rotating means so as to feed the roast rods supplied from the roast rod-supplying box along horizontal lines defining the opening of the main body.

2. The turning type charcoal roast board as claimed in claim 1, wherein containers for containing meat, vegetables, seasoned bean paste, and the like are further installed on top surfaces of the first and second case portions of the main body in such a manner that they are installed detachably while conforming to patterns on the top surfaces of the first and second case portions.

3. The turning type charcoal roast board as claimed in claim 1, wherein the first case portion is formed with a door configured such that one side of the door can be opened upwardly while pivoting on a hinge shaft formed at the other side thereof, and the second case portion is formed with a door configured to be in the form of a lid that is detachably opened by being lifted upwardly.

4. The turning type charcoal roast board as claimed in claim 1, wherein the roast rod-receiving box is detachably installed at the second case portion such that it can be inserted into or withdrawn from one side of the second case portion in the form of a drawer, the roast rod-receiving box being used as a door.

5. The turning type charcoal roast board as claimed in claim 1, wherein the roast rod-supplying unit is further provided with a pivoting unit configured by means of a combination of a spring and a pivoting hinge installed on a floor of the first case portion at the rear of the discharge port of the roast rod-supplying box so as to smoothly supply the roast rods from the roast rod-supplying box to the moving means one by one, the pivoting unit performing a seesaw motion.

6. The turning type charcoal roast board as claimed in claim 1, wherein the roast rod-receiving/discharging unit is further provided with a guide body for guiding the moving roast rods between the second rotating means and the roast rod-receiving box, and a roast rod-discharging hook for allowing the roast rods moving toward a sidewall of the second case portion where the second rotating means is formed to be stably received in the roast rod-receiving box.

7. The turning type charcoal roast board as claimed in claim 1, wherein the moving means of the roast rod-moving unit optionally comprises a belt or chain with a structure by which the roast rods can be received from the roast rod-supplying portion and then transferred in a fixed state.

8. The turning type charcoal roast board as claimed in claim 1, wherein the moving means of the roast rod-moving unit is configured to take the shape of a circle with a predetermined length of circumference by connecting or assembling a plurality of catching pieces each of which has a hook formed at one side thereof and a semicircular recess formed at the center thereof a plurality of chain pins inserted into and connected to both sides of each of the catching pieces in a state where the plurality of catching pieces cross each other, and a plurality of guide pieces for guiding the roast rods seated in the semicircular recesses of the catching pieces so that the roast rods can be stably aligned without protruding from the recesses.

9. A turning type charcoal roast board, comprising:
a main body including a central portion having an open top face and a floor surface on which a charcoal fire is contained, control devices installed on front and rear faces of first and second case portions formed on both sides of the central portion of the main body, doors formed at the tops of the first and second case portions such that they can be opened and closed by pivoting on hinge shafts, lids formed to be opened outwardly from the center of the top face of the main body, and four legs formed on a bottom surface of the main body;
a roast rod-supplying unit including a roast rod-supplying box for supplying roast rods to the inner space of the first case portion one by one, and a first rotating means installed in front of a discharge port of the roast rod-supplying box and connected to the control devices;
a roast rod-receiving/discharging unit including a roast rod-receiving box installed in the inner space of the second case portion, and a second rotating means installed adjacent to a side of the roast rod receiving box; and
a roast rod-moving unit including a roast rod-moving means rotated by being engaged with the first and second rotating means so as to feed the roast rods supplied from the roast rod-supplying box along horizontal lines defining the opening of the main body.

10. The turning type charcoal roast board as claimed in claim 9, wherein a brazier for containing a charcoal fire therein is further installed such that it can be withdrawn outwardly in the form of a drawer by a door from a front face and/or a rear face of the central portion of the main body of the roast board.

11. The turning type charcoal roast board as claimed in claim 9, wherein inner surfaces of the lids installed at the top of the central portion of the main body of the roast board are further formed with container portions of predetermined depths, the container portions being partitioned to separately contain meat, vegetables, seasoned bean paste and the like therein when the lids are opened.

12. The turning type charcoal roast board as claimed in claim 9, wherein the four legs formed on the bottom surface of the main body is further equipped with downwardly tapered cylindrical auxiliary legs with a predetermined length when the roast board is used for outdoor barbecue cooking.

13. The turning type charcoal roast board as claimed in claim 9, wherein the roast rod-supplying unit is further provided with a pivoting unit configured by means of a combination of a spring and a pivoting hinge installed on a floor of the first case portion at the rear of the discharge port of the roast rod-supplying box so as to smoothly supply the roast rods from the roast rod-supplying box to the moving means one by one, the pivoting unit performing a seesaw motion.

14. The turning type charcoal roast board as claimed in claim 9, wherein the roast rod-receiving/discharging unit is further provided with a guide body for guiding the moving roast rods between the second rotating means and the roast rod-receiving box, and a roast rod-discharging hook for allowing the roast rods moving toward a sidewall of the second case portion where the second means is formed to be stably received in the roast rod-receiving box.

15. The turning type charcoal roast board as claimed in claim 9, wherein the moving means of the roast rod-moving unit optionally comprises a belt or chain with a structure by which the roast rods can be received from the roast rod-supplying portion and then transferred in a fixed state.

16. The turning type charcoal roast board as claimed in claim 9, wherein the moving means of the roast rod-moving unit is configured to take the shape of a circle with a predetermined length of circumference by connecting or assembling a plurality of catching pieces each of which has a hook formed at one side thereof and a semicircular recess formed at the center thereof, a plurality of chain pins inserted into and connected to both sides of each of the catching pieces in a state where the plurality of catching pieces cross each other, and a plurality of guide pieces for guiding the roast rods seated in the semicircular recesses of the catching pieces so that the roast rods can be stably aligned without protruding from the recesses.

17. The turning type charcoal roast board as claimed in claim 3, wherein the roast rod-receiving box is detachably installed at the second case portion such that it can be inserted into or withdrawn from one side of the second ease portion in the form of a drawer, the roast rod-receiving box being used as a door.

18. The turning type charcoal roast board as claimed in claim 7, wherein the moving means of the roast rod-moving unit is configured to take the shape of a circle with a predetermined length of circumference by connecting or assembling a plurality of catching pieces each of which has a hook formed at one side thereof and a semicircular recess formed at the center thereof, a plurality of chain pins inserted into and connected to both sides of each of the catching pieces in a state where the plurality of catching pieces cross each other, and a plurality of guide pieces for guiding the roast rods seated in the semicircular recesses of the catching pieces so that the roast rods can be stably aligned without protruding from the recesses.

19. The turning type charcoal roast board as claimed in claim 15, wherein the moving means of the roast rod-moving unit is configured to take the shape of a circle with a predetermined length of circumference by connecting or assembling a plurality of catching pieces each of which has a hook formed at one side thereof and a semicircular recess formed at the center thereof, a plurality of chain pins inserted into and connected to both sides of each of the catching pieces in a state where the plurality of catching pieces cross each other, and a plurality of guide pieces for guiding the roast rods seated in the semicircular recesses of the catching pieces so that the roast rods can be stably aligned without protruding from the recesses.

* * * * *